(12) United States Patent
Hwang et al.

(10) Patent No.: US 8,822,629 B2
(45) Date of Patent: Sep. 2, 2014

(54) METHOD OF PREPARING A HEAT-RESISTANT POLYAMIDE

(75) Inventors: Dong-June Hwang, Incheon (KR);
Jae-Bong Lim, Gyeonggi-do (KR);
Seung-Do Leem, Gyeonggi-do (KR);
Tae-Young Kim, Gyeonggi-do (KR);
Sung-su Bae, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 0 days.

(21) Appl. No.: 13/263,620

(22) PCT Filed: Apr. 10, 2009

(86) PCT No.: PCT/KR2009/001857
§ 371 (c)(1),
(2), (4) Date: Oct. 7, 2011

(87) PCT Pub. No.: WO2010/117098
PCT Pub. Date: Oct. 14, 2010

(65) Prior Publication Data
US 2012/0029163 A1    Feb. 2, 2012

(51) Int. Cl.
*C08G 69/26* (2006.01)

(52) U.S. Cl.
USPC ........... 528/310; 528/307; 528/324; 528/330; 528/346

(58) Field of Classification Search
USPC ........................ 528/310, 307, 324, 330, 346
See application file for complete search history.

(56) References Cited

U.S. PATENT DOCUMENTS

| | | |
|---|---|---|
| 3,242,141 A | 3/1966 | Vertnik, L. R., et al. |
| 3,459,714 A | 8/1969 | Wolfes et al. |
| 3,692,749 A * | 9/1972 | Schmitt et al. ............... 528/346 |
| 4,567,249 A | 1/1986 | Fox et al. |
| 5,019,641 A | 5/1991 | Clagett et al. |
| 2004/0049006 A1 * | 3/2004 | Aramaki et al. ............. 528/335 |

FOREIGN PATENT DOCUMENTS

WO    WO-2010/117098 A2    10/2010

OTHER PUBLICATIONS

"Application Serial No. PCT/KR2009/001857, International Search Report mailed Sep. 14, 2010", 4 pgs.
Korean Patent Application Serial No. 10-2007-0116406, Office Action mailed Mar. 14, 2014, 4 pgs.

* cited by examiner

*Primary Examiner* — Gregory Listvoyb
(74) *Attorney, Agent, or Firm* — Schwegman Lundberg & Woessner, P.A.

(57) ABSTRACT

The present invention relates to a method of preparing a heat-resistant polyamide by carrying out condensation polymerization with a monomer mixture including a diester compound and a diamine compound. The present invention provides an economical method of preparing a heat-resistant polyamide in that a monomer, a raw material, is simply and chiefly prepared, and the polymerizing reaction time is short because it does not need solvent separately.

8 Claims, No Drawings

METHOD OF PREPARING A HEAT-RESISTANT POLYAMIDE

CROSS REFERENCE TO RELATED APPLICATION

This application is a nationalization under 35 U.S.C. 371 of PCT/KR2009/001857 filed Apr. 10, 2009 and published as WO 2010/117098 A2 on Oct. 14, 2010, which application and publication are incorporated herein by reference in their entirety.

BACKGROUND OF THE INVENTION (a) Field of the Invention

The present invention relates to a method of preparing a polyamide, and particularly to an economical method of preparing a heat-resistant polyamide in that a monomer, a raw material, is simply and chiefly prepared and the polymerizing reaction time is short because it does not need a solvent separately.

(b) Description of the Related Art

A polyamide represented by nylon 6 and nylon 66 is widely used to fibers, films, sheets, injection-molded articles, and the like because of its superior mechanical properties and chemical resistance. However, there is a problem of that the heat-resistance of nylon 6 and nylon 66 is insufficient to be applied to semiconductor processing equipments, circuit boards, parts of automobiles and airplanes, and the like, because they have the melting temperature of 230° C. and 260° C., respectively, and thus do not have sufficient heat resistance.

To resolve the problem related to the heat-resistance, nylon 46 was prepared by reacting butane diamine and adipic acid, and it has relatively high melting temperature of 290° C. However, it has a limit to its application due to hygroscopic property due to high amide bonds density, and it also has a limit to be widely used because the monomers of the aromatic polyamide obtained by using an aromatic dicarboxylic acid and an aromatic diamine instead of an aliphatic dicarboxylic acid or an aliphatic diamine are expensive.

In addition, there are high heat-resistant resin such as a polyimide, a polyetherketone, an aromatic polyamide, a polyphenylenesulfide, and the like. However, they have disadvantages of that they are also expensive and their preparing methods are complicated.

That is, prior methods of preparing the polyamide are carried out by preparing a salt of dicarboxylic acid and diamine in diethanol, separating the salt therefrom, dissolving the separated salt into plenty of solvent, for example plenty of water, eliminating the water with pressured and vacuum condition at high temperature, and so on, and thus the methods are complicated. Furthermore, the methods are not economical because the methods consume plenty of water and need much energy to eliminate the water.

SUMMARY OF THE INVENTION

To resolve the problems of prior arts disclosed above, it is an aspect of the present invention to provide a method of preparing a heat-resistant polyamide in that a monomer, a raw material, is simply and chiefly prepared.

To achieve the technical aspect, the present invention provides a method of preparing a heat-resistant polyamide including a repeating unit represented by Chemical Formula 3 by carrying out condensation polymerization with a monomer mixture including a diester compound represented by Chemical Formula 1 and a diamine compound represented by Chemical Formula 2:

Chemical Formula 1

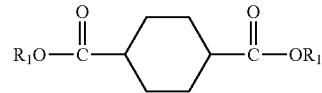

wherein, $R_1$ is a $C_1$-$C_{20}$ aliphatic hydrocarbon or a $C_6$-$C_{20}$ aromatic hydrocarbon,

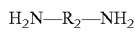 [Chemical Formula 2]

wherein, $R_2$ is a $C_1$-$C_{20}$ aliphatic hydrocarbon or a $C_6$-$C_{20}$ aromatic hydrocarbon, Chemical Formula 3

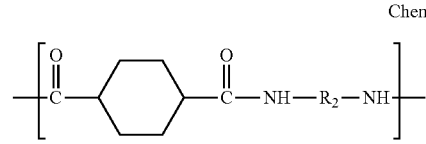

wherein, $R_2$ is a $C_1$-$C_{20}$ aliphatic hydrocarbon or a $C_6$-$C_{20}$ aromatic hydrocarbon.

Here, the diamine compound represented by Chemical Formula 2 may be hexamethylene diamine (HMDA) or 2-methyl-1,5-pentane diamine (MPDA).

Furthermore, the monomer mixture may further include a dicarboxylic acid represented by the following Chemical Formula 4:

Chemical Formula 4

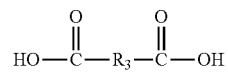

wherein, $R_3$ is a $C_2$-$C_{20}$ aliphatic hydrocarbon or a $C_6$-$C_{20}$ aromatic hydrocarbon.

DETAILED DESCRIPTION OF THE EMBODIMENTS

Hereinafter, the present invention is explained in more detail.

The heat-resistant polyamide according to one embodiment of the present invention can be prepared by polymerizing the diester compound represented by Chemical Formula 1 with the diamine compound represented by Chemical Formula 2, wherein the diester compound may be obtained by reducing an aromatic ring of an aromatic diester compound through hydrogenation.

Because the aromatic diester compound is cheap and it is an intermediate for synthesizing 1,4-cyclohexane dicarboxylic acid that is used for preparing prior polyamides, the present invention has a merit of that it is possible to prepare the polyamide in low price by reducing the reaction steps in comparison to prior arts.

Furthermore, the present invention has a merit of that the reaction is simple and the reaction rate is fast, because the diester compound represented by Chemical Formula 1 is easily dissolved in the diamine compound represented by Chemical Formula 2, and it does not need a solvent separately. Therefore, the present invention does not need the steps of separating salt, dissolving the separated salt into a solvent including water, and eliminating the water with vacuum condition at high temperature, and thus the present invention has a merit of reducing enormous energy loss for eliminating the solvent. The present invention also have a merit of that it is possible to reduce the manufacturing cost of the final product, the heat-resistant polyamide, considerably, because the equipments for carrying out the process are simple and thus it is possible to simplify the process.

In the method of preparing the heat-resistant polyamide according to one embodiment of the present invention, the heat-resistant polyamide may be prepared by carrying out condensation polymerization with the diester compound represented by Chemical Formula 1 and the diamine compound represented by Chemical Formula 2, as illustrated in the following Reaction Formula 1:

Reaction Formula 1

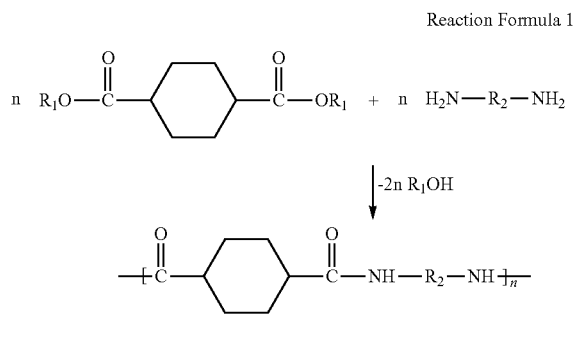

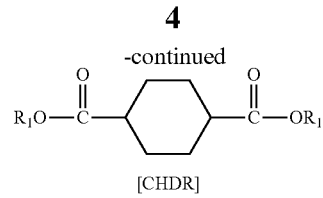

[CHDR]

wherein, $R_1$ may be a $C_1$-$C_{20}$ aliphatic hydrocarbon or a $C_6$-$C_{20}$ aromatic hydrocarbon, and preferably a $C_1$-$C_{14}$ aliphatic hydrocarbon or a $C_6$-$C_{14}$ aromatic hydrocarbon.

The aromatic diester compound may be a dialkyl terephthalate or a diaryl terephthalate. When the aromatic diester compound is a dialkyl terephthalate, $R_1$ may be a $C_1$-$C_6$ alkyl most preferably, as disclosed above.

1,4-cyclohaxane dicarboxylic acid (CHA) is used in the preparation method of the heat-resistant polyamide according to prior arts, and said 1,4-cyclohaxane dicarboxylic acid is prepared from a terephthalate, particularly from a dialkyl terephthalate. Said aromatic diester compound used in the present invention is an intermediate for synthesizing said 1,4-cyclohaxane dicarboxylic acid used in the prior arts. Therefore, the present invention can prepare the heat-resistant polyamide more economically and quickly by reducing whole reaction steps for preparing the polyamide.

The present invention also provides a copolymer represented by Chemical Formula 5 prepared by carrying out condensation polymerization with an aliphatic or aromatic dicarboxylic acid represented by Chemical Formula 4 in company with the diester compound represented by Chemical Formula 1 and the diamine compound represented by Chemical Formula 2, and a method of preparing the same:

Chemical Formula 5

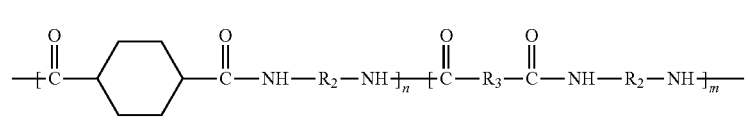

wherein, $R_1$ and $R_2$ may be a $C_1$-$C_{20}$ aliphatic hydrocarbon or a $C_6$-$C_{20}$ aromatic hydrocarbon, and preferably a $C_1$-$C_{14}$ aliphatic hydrocarbon or a $C_6$-$C_{14}$ aromatic hydrocarbon. More preferably, $R_1$ may be a $C_1$-$C_6$ alkyl in Chemical Formula 1. Most preferably, the compound represented by Chemical Formula 1 may be 1,4-cyclohexane dicarboxylic acid dimethyl-ester (or dimethyl cyclohexane-1,4-dicarboxylate), namely, $R_1$ is methyl in Chemical Formula 1.

Furthermore, it is preferable that $R_2$ is a $C_1$-$C_{10}$ linear or branched alkylene in Chemical Formula 2. More preferably, the diamine compound represented by Chemical Formula 2 may be hexamethylene diamine (HMDA) or 2-methyl-1,5-pentane diamine (MPDA).

Furthermore, the diester compound represented by Chemical Formula 1 may be prepared by hydrogen-reduction reaction of the aromatic diester compound, as illustrated in the following Reaction Formula 2:

Reaction Formula 2

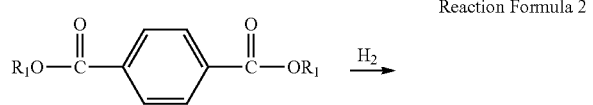

wherein, $R_2$ is a $C_1$-$C_{20}$ aliphatic hydrocarbon or a $C_6$-$C_{20}$ aromatic hydrocarbon, and preferably a $C_1$-$C_{14}$ aliphatic hydrocarbon or a $C_6$-$C_{14}$ aromatic hydrocarbon;

$R_3$ is a $C_2$-$C_{20}$ aliphatic hydrocarbon or a $C_6$-$C_{20}$ aromatic hydrocarbon;

n is a natural number of 1 to 999; and m is a natural number of 1 to 999.

Most preferably, $R_2$ may be a $C_1$-$C_{10}$ linear or branched alkylene, and $R_3$ may be a $C_2$-$C_6$ alkylene or phenylene.

Particularly, the dicarboxylic acid represented by Chemical Formula 4 may preferably be at least one selected from the group consisting of adipic acid, succinic acid, terephthalic acid, isophthalic acid, phthalic acid, and phthalic anhydride.

As illustrated in the following Reaction Formula 3, the copolymer of Chemical Formula 5 may be prepared by carrying out condensation polymerization with a monomer mixture including the aliphatic or aromatic dicarboxylic acid represented by Chemical Formula 4 in addition to the mixture including the diester compound represented by Chemical Formula 1 and the diamine compound represented by Chemical Formula 2. As disclosed above, when proceeding the condensation polymerization by adding the dicarboxylic acid represented by Chemical Formula 4 to the diester compound represented by Chemical Formula 1 and the diamine compound represented by Chemical Formula 2, there is a merit of that the melting temperature of the heat-resistant polyamide can easily be controlled by controlling the mole ratio of the dicarboxylic acid added therein suitably.

glass-transition temperature of the polymerized chip, and infusing nitrogen or argon gas therein or making the reactor vacuous.

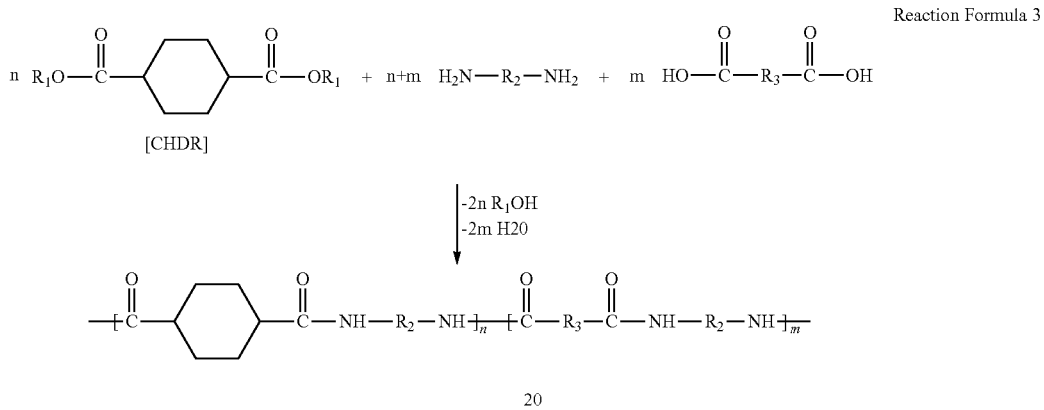

Reaction Formula 3 wherein, $R_1$ and $R_2$ may be a $C_1$-$C_{20}$ aliphatic hydrocarbon or a $C_6$-$C_{20}$ aromatic hydrocarbon, and preferably a $C_1$-$C_{14}$ aliphatic hydrocarbon or a $C_6$-$C_{14}$ aromatic hydrocarbon; and $R_3$ may be a $C_2$-$C_{20}$ aliphatic hydrocarbon or a $C_6$-$C_{20}$ aromatic hydrocarbon, and preferably a $C_2$-$C_6$ alkylene or phenylene.

The concrete method for condensation polymerization of the heat-resistant polyamide prepared through the reaction disclosed above is as follows.

First, the diester compound and the diamine compound are introduced into an autoclave reactor equipped with a stirrer and a reflux device. In case of preparing the copolymer represented by Chemical Formula 5, the aliphatic or aromatic dicarboxylic acid is further introduced therein.

After introducing the reactants, the autoclave reactor is stirred with increasing the temperature of it. The alcohol is distilled out when the internal temperature of the reactor is increased to 65° C. or more, and it is collected by using a condenser.

When a half of theoretical amount of the alcohol is collected, the air in the reactor is replaced with an inert gas such as nitrogen, argon, and the like, and the reactor is sealed to increase the internal pressure of the reactor.

The reaction is carried out by increasing the reaction temperature to 300 to 400° C., and stirring the reactants for 1 hour to 3 hours, preferably for 1 hour 45 minutes to 2 hours 15 minutes, and more preferably for about 2 hours. At this time, the internal pressure of the reactor is controlled not to exceed 20 kgf/cm² by using a valve.

After making the internal pressure of the reactor to be an atmospheric pressure by opening the valve slowly, the internal pressure of the reactor is further lowered to be 1 torr or less by using a vacuum pump, and the stirring is continued for 2 hours to 4 hours, preferably for 2 hours 30 minutes to 3 hours 30 minutes, and more preferably for about 3 hours.

When the viscosity of the reactant reaches to a required value by measuring the torque or the current loaded to the stirrer, the inert gas such as nitrogen, argon, and the like is infused into the reactor to release the vacuum, and the product is discharged by using the infusing pressure of the inert gas.

As occasion demands, it is possible to carry out an additional solid-state polymerization reaction. The solid-state polymerization may be carried out by introducing the polymerized chips having a certain size into a reactor equipped with a stirring device, elevating the temperature over the As shown above, the method of preparing the heat-resistant polyamide according to the present invention uses cheap monomer that can easily be prepared through hydrogenation, and does not include the complex processes of separating salt, dissolving the separated salt by using plenty of water as a solvent, and eliminating the water, those are complicated and need enormous energy. Therefore, the present invention can provide simple and economical method of preparing the heat-resistant polyamide because the steps of polymerization are short, and the energy loss is greatly reduced.

Hereinafter, preferable examples and comparative examples are presented for understanding the present invention. However, the following examples are only for illustrating the present invention and the present invention is not limited to or by them.

EXAMPLE 1

200 g (1 equivalent) of 1,4-cyclohexane dicarboxylic acid dimethylester (Aldrich Co., mixture of cis and trans) and 233 g (2 equivalents) of hexamethylene diamine (Aldrich Co.) were introduced into an autoclave reactor, and they were stirred and mixed. After elevating the temperature to 75° C., evaporated methanol was collected by condensing through a condenser. When 32 g of methanol was distilled, nitrogen gas was infused into the reactor to eliminate oxygen, the temperature was elevated to 400° C. after closing a valve, and then the mixture was stirred for 2 hours. The internal pressure of the reactor was lowered to an atmospheric pressure by opening the valve slowly, and the mixture was polymerized for 3 hours by making the reactor vacuous so that the pressure became 1 torr or less. And then the polymerized heat-resistant polyamide was discharged through a lower discharging device of the reactor by infusing nitrogen gas after opening the valve so as to release the vacuum, and the discharged polyamide was made into chips having a certain size by using a cutter after being cooled in water.

EXAMPLE 2

The heat-resistant polyamide was prepared substantially according to the same method as in Example 1, except that 2-methyl-1,5-pentane diamine was used instead of hexamethylene diamine.

EXAMPLE 3

The heat-resistant polyamide was prepared substantially according to the same method as in Example 1, except that 228 g (1 equivalent) of 1,4-cyclohexane dicarboxylic acid diethylester (or diethyl cyclohexane-1,4-dicarboxylate) was used instead of 200 g (1 equivalent) of 1,4-cyclohexane dicarboxylic acid dimethylester.

At this time, said 1,4-cyclohexane dicarboxylic acid diethylester was synthesized by carrying out a trans-esterification reaction according to the method of dissolving 1 equivalent of 1,4-cyclohexane dicarboxylic acid dimethylester and 2 equivalents of ethanol into xylene, and eliminating methanol while refluxing the same by using a dean-stack device.

EXAMPLE 4

The heat-resistant polyamide was prepared substantially according to the same method as in Example 1, except that 256 g (1 equivalent) of 1,4-cyclohexane dicarboxylic acid dipropylester (or dipropyl cyclohexane-1,4-dicarboxylate) was used instead of 200 g (1 equivalent) of 1,4-cyclohexane dicarboxylic acid dimethylester.

At this time, said 1,4-cyclohexane dicarboxylic acid dipropylester was synthesized by carrying out a trans-esterification reaction according to the method of dissolving 1 equivalent of 1,4-cyclohexane dicarboxylic acid dimethylester and 2 equivalents of propanol into xylene, and eliminating methanol while refluxing the same by using a dean-stack device.

EXAMPLE 5

The heat-resistant polyamide was prepared substantially according to the same method as in Example 1, except that 284 g (1 equivalent) of 1,4-cyclohexane dicarboxylic acid dibutylester (or dibutyl cyclohexane-1,4-dicarboxylate) was used instead of 200 g (1 equivalent) of 1,4-cyclohexane dicarboxylic acid dimethylester.

At this time, said 1,4-cyclohexane dicarboxylic acid dibutylester was synthesized by carrying out a trans-esterification reaction according to the method of dissolving 1 equivalent of 1,4-cyclohexane dicarboxylic acid dimethylester and 2 equivalents of butanol into xylene, and eliminating methanol while refluxing the same by using a dean-stack device.

EXAMPLE 6

The heat-resistant polyamide was prepared substantially according to the same method as in Example 1, except that 324 g (1 equivalent) of 1,4-cyclohexane dicarboxylic acid diphenylester (or diphenyl cyclohexane-1,4-dicarboxylate) was used instead of 200 g (1 equivalent) of 1,4-cyclohexane dicarboxylic acid dimethylester.

At this time, said 1,4-cyclohexane dicarboxylic acid diphenylester was synthesized by carrying out a trans-esterification reaction according to the method of dissolving 1 equivalent of 1,4-cyclohexane dicarboxylic acid dimethylester and 2 equivalents of phenol into xylene, and eliminating methanol while refluxing the same by using a dean-stack device.

The details of Examples 1 to 6 are listed in the following Table 1.

TABLE 1

|  | Diester | Diamine | Viscosity [g/dl] | Melting Point [° C.] |
| --- | --- | --- | --- | --- |
| Example 1 | 1,4-cyclohexane dicarboxylic acid dimethylester | Hexamethylene diamine | 0.65 | 375 |
| Example 2 | 1,4-cyclohexane dicarboxylic acid dimethylester | 2-methyl-1,5-pentane diamine | 0.63 | 340 |
| Example 3 | 1,4-cyclohexane dicarboxylic acid diethylester | Hexamethylene diamine | 0.63 | 373 |
| Example 4 | 1,4-cyclohexane dicarboxylic acid dipropylester | Hexamethylene diamine | 0.61 | 375 |
| Example 5 | 1,4-cyclohexane dicarboxylic acid dibutylester | Hexamethylene diamine | 0.53 | 374 |
| Example 6 | 1,4-cyclohexane dicarboxylic acid diphenylester | Hexamethylene diamine | 0.57 | 373 |

Comparative Examples 1 to 6

The heat-resistant polyamides were prepared substantially according to the same method as in Example 1, except that 1 equivalent of dicarboxylic acid listed in the following Table 2 instead of 1 equivalent of 1,4-cyclohexane dicarboxylic acid dimethylester, and 2 equivalents of diamine listed in the following Table 2 was used instead of 2 equivalents of hexamethylene diamine.

TABLE 2

|  | Dicarboxylic acid | Diamine | Viscosity [g/dl] | Melting point [° C.] |
| --- | --- | --- | --- | --- |
| Comparative Example 1 | Adipic acid | Ethylene diamine | 0.31 | 395 |
| Comparative Example 2 | Succinic acid | Propylene diamine | 0.38 | 364 |
| Comparative Example 3 | Terephthalic acid | Butylene diamine | 0.35 | 385 |
| Comparative Example 4 | Isophthalic acid | Octylene diamine | 0.27 | 312 |
| Comparative Example 5 | Phthalic acid | Decane diamine | 0.24 | 305 |
| Comparative Example 6 | Phthalic anhydride | Dodecane diamine | 0.23 | 280 |

EXAMPLE 7 TO 36

The heat-resistant polyamides were prepared substantially according to the same method as in Example 1, except that 1 equivalent of 1,4-cyclohexane dicarboxylic acid dimethylester (CHDR) and the dicarboxylic acids listed in the following Table 3 were used according to the following mole ratio instead of 1 equivalent of 1,4-cyclohexane dicarboxylic acid dimethylester, and 2 equivalents of hexamethylene diamine (HMDA) listed in the following Table 3 or 2 equivalents of 2-methyl-1,5-pentane diamine (MPDA) was used instead of 2 equivalents of hexamethylene diamine.

TABLE 3

|  | CHDR [mol %] | Dicarboxylic acid for copolymerization (mol %) | Diamine | Viscosity [g/dl] | Melting point [° C.] |
| --- | --- | --- | --- | --- | --- |
| Example 7 | 10 | Adipic acid (90) | HMDA | 0.66 | 283 |
| Example 8 | 50 | Adipic acid (50) | HMDA | 0.55 | 310 |
| Example 9 | 90 | Adipic acid (10) | HMDA | 0.54 | 355 |

TABLE 3-continued

| | CHDR [mol %] | Dicarboxylic acid for copolymer-ization (mol %) | Diamine | Viscosity [g/dl] | Melting point [° C.] |
|---|---|---|---|---|---|
| Example 10 | 10 | Adipic acid (90) | MPDA | 0.67 | 264 |
| Example 11 | 50 | Adipic acid (50) | MPDA | 0.65 | 290 |
| Example 12 | 90 | Adipic acid (10) | MPDA | 0.67 | 325 |
| Example 13 | 10 | Succinic acid (90) | HMDA | 0.55 | 301 |
| Example 14 | 50 | Succinic acid (50) | HMDA | 0.48 | 345 |
| Example 15 | 90 | Succinic acid (10) | HMDA | 0.45 | 358 |
| Example 16 | 10 | Succinic acid (90) | MPDA | 0.57 | 293 |
| Example 17 | 50 | Succinic acid (50) | MPDA | 0.53 | 310 |
| Example 18 | 90 | Succinic acid (10) | MPDA | 0.53 | 334 |
| Example 19 | 10 | Terephthalic acid (90) | HMDA | 0.47 | 338 |
| Example 20 | 50 | Terephthalic acid (50) | HMDA | 0.44 | 359 |
| Example 21 | 90 | Terephthalic acid (10) | HMDA | 0.54 | — |
| Example 22 | 10 | Terephthalic acid (90) | MPDA | 0.47 | 325 |
| Example 23 | 50 | Terephthalic acid (50) | MPDA | 0.49 | 350 |
| Example 24 | 90 | Terephthalic acid (10) | MPDA | 0.44 | — |
| Example 25 | 10 | Isophthalic acid (90) | HMDA | 0.51 | 318 |
| Example 26 | 50 | Isophthalic acid (50) | HMDA | 0.53 | 348 |
| Example 27 | 90 | Isophthalic acid (10) | HMDA | 0.58 | — |
| Example 28 | 10 | Isophthalic acid (90) | MPDA | 0.47 | 328 |
| Example 29 | 50 | Isophthalic acid (50) | MPDA | 0.55 | 360 |
| Example 30 | 90 | Isophthalic acid (10) | MPDA | 0.52 | — |
| Example 31 | 10 | Phthalic acid (90) | HMDA | 0.43 | 293 |
| Example 32 | 50 | Phthalic acid (50) | HMDA | 0.47 | 310 |
| Example 33 | 90 | Phthalic acid (10) | HMDA | 0.51 | 370 |
| Example 34 | 10 | Phthalic acid (90) | MPDA | 0.47 | 286 |
| Example 35 | 50 | Phthalic acid (50) | MPDA | 0.42 | 305 |
| Example 36 | 90 | Phthalic acid (10) | MPDA | 0.44 | 317 |

—; examples where thermal degradation was occurred before the melting point.

EXPERIMENTAL EXAMPLES

The properties of the heat-resistant polyamide prepared in Examples and Comparative Examples were measured by the following methods, and the results are listed in the above Tables 1 to 3.

Viscosity

The viscosity of the heat-resistant polyamides prepared by the above method was measured by using an Ostwald Viscosimeter at 35° C. after dissolving the polyamides into meta-cresol.

Melting Point

The melting point was measured by using a differential scanning calorimeter (DSC) with a scan velocity of 10° C./min.

As shown in Table 1, the polyamides prepared according to the methods of Examples 1 to 6 show the melting point suitable for the heat-resistant polyamide, however, it is recognized that the polymers prepared according to the present simple method by using the materials disclosed in Comparative Examples 1 to 6 have good heat-resistance but their degree of polymerization is not high. More particularly, the polymers of Comparative Examples are inadequate, because additional works, such as increasing reaction time or applying a solid-state polymerization, are needed for obtaining the polymers having high degree of polymerization. However, it is recognized that the polymers polymerized according to the Examples of the present invention can be obtained by simple process, and yet the heat-resistance is good and the degree of polymerization is adequate.

Furthermore, it is recognized from Examples 7 to 36 that the method of preparing the polyamide of the present invention can easily control the melting temperature of the heat-resistant polyamide prepared finally, by introducing the dicarboxylic acids according to controlled mole ratio in addition, and carrying out the condensation polymerization.

What is claimed is:

1. A method of preparing a heat-resistant polyamide, the method comprising:
   introducing into a reactor a monomer mixture comprising a diester compound represented by Chemical Formula 1

Chemical Formula 1

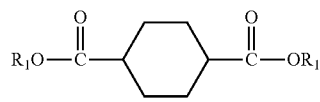

wherein at each occurrence $R_1$ is independently chosen from methyl, ethyl, propyl, butyl, and phenyl,
   and a liquid-phase diamine compound represented by Chemical Formula 2

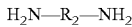

Chemical Formula 2 wherein, $R_2$ is independently chosen from hexamethylene and 2-methyl-1,5-pentanylene;
   increasing the internal temperature of the reactor to about 65° C. or more; and
   carrying out a condensation polymerization comprising increasing the reaction temperature to a temperature that is about 340° C. to about 400° C. and that is equal to or greater than the melting point of the heat resistant polyamide, and stirring the reactants for about 1 hour to about 3 hours, to give the heat resistant polyamide comprising a repeating unit represented by Chemical Formula 3

Chemical Formula 3

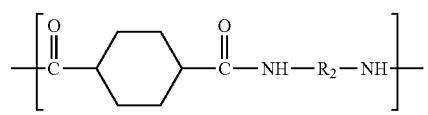

wherein the condensation polymerization is carried out neat.

2. The method according to claim 1, wherein the monomer mixture further comprises a dicarboxylic acid represented by Chemical Formula 4

Chemical Formula 4

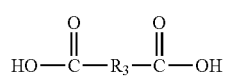

wherein $R_3$ is a $C_2$-$C_{20}$ aliphatic hydrocarbon or a $C_6$-$C_{20}$ aromatic hydrocarbon.

3. The method according to claim 2, wherein the dicarboxylic acid is at least one compound selected from the group consisting of adipic acid, succinic acid, terephthalic acid, isophthalic acid, phthalic acid, and phthalic anhydride.

4. A heat-resistant polyamide prepared by the method according to claim 1 comprising a repeating unit represented by Chemical Formula 3

Chemical Formula 3

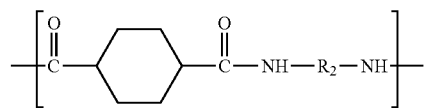

5. The heat-resistant polyamide according to claim 4 comprising repeating units represented by Chemical Formula 5

Chemical Formula 5

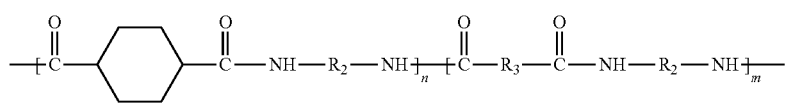

wherein,
at each occurrence $R_2$ is chosen from hexamethylene and 2-methyl-1,5-pentanylene;
at each occurrence $R_3$ is chosen from a $C_2$-$C_{20}$ aliphatic hydrocarbon and a $C_6$-$C_{20}$ aromatic hydrocarbon;
n is a natural number of 1 to about 999; and
m is a natural number of 1 to about 999.

6. The method according to claim 1, which further comprises replacing the air in the reactor with an inert gas after increasing the internal temperature of the reactor to about 65° C. or more.

7. The method according to claim 1, which further comprises lowering the internal pressure of the reactor to be about 1 torr or less and stirring the reactant for about 2 hours to about 4 hours, after the condensation polymerization.

8. A method of preparing a heat-resistant polyamide, the method comprising:
introducing into a reactor a monomer mixture comprising a diester compound represented by Chemical Formula 1

Chemical Formula 1

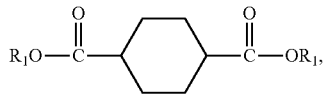

and a liquid-phase diamine compound represented by Chemical Formula 2

$H_2N$—$R_2$—$NH_2$      Chemical Formula 2;

increasing the internal temperature of the reactor to about 65° C. or more; and
carrying out a condensation polymerization comprising increasing the reaction temperature to a temperature that is about 340° C. to about 400° C. and that is equal to or greater than the melting point of the heat resistant polyamide, and stirring the reactants for about 1 hour to about 3 hours, to give the heat resistant polyamide comprising a repeating unit represented by Chemical Formula 3

Chemical Formula 3

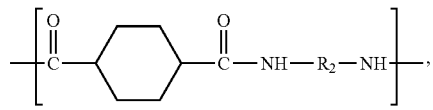

wherein at least one of
$R_1$ is methyl and $R_2$ is hexamethylene,
$R_1$ is methyl and $R_2$ is 2-methyl-1,5-pentanylene,
$R_1$ is ethyl and $R_2$ is hexamethylene,
$R_1$ is propyl and $R_2$ is hexamethylene,
$R_1$ is butyl and $R_2$ is hexamethylene, and
$R_1$ is phenyl and $R_2$ is hexamethylene;
wherein the condensation polymerization is carried out neat.

* * * * *

UNITED STATES PATENT AND TRADEMARK OFFICE
CERTIFICATE OF CORRECTION

| | | |
|---|---|---|
| PATENT NO. | : 8,822,629 B2 | Page 1 of 1 |
| APPLICATION NO. | : 13/263620 | |
| DATED | : September 2, 2014 | |
| INVENTOR(S) | : Hwang et al. | |

It is certified that error appears in the above-identified patent and that said Letters Patent is hereby corrected as shown below:

On the title page, in item (57), in "Abstract", in column 2, line 1, delete "prepairing" and insert --preparing--, therefor On the title page, in item (57), in "Abstract", in column 2, line 5, delete "prepairing" and insert --preparing--, therefor Signed and Sealed this
Twenty-fourth Day of February, 2015

Michelle K. Lee
*Deputy Director of the United States Patent and Trademark Office*